US011398902B2

(12) United States Patent
Lanc

(10) Patent No.: US 11,398,902 B2
(45) Date of Patent: Jul. 26, 2022

(54) SYSTEMS AND METHODS FOR NON-DETERMINISTIC MULTI-PARTY, MULTI-USER SENDER-RECEIVER AUTHENTICATION AND NON-REPUDIATABLE RESILIENT AUTHORIZED ACCESS TO SECRET DATA

(71) Applicant: CYBORN LIMITED, Edinburgh (GB)

(72) Inventor: David Lanc, Edinburgh (GB)

(73) Assignee: CYBORN LIMITED, Edinburgh (GB)

( * ) Notice: Subject to any disclaimer, the term of this patent is extended or adjusted under 35 U.S.C. 154(b) by 0 days.

(21) Appl. No.: 17/016,595

(22) Filed: Sep. 10, 2020

(65) Prior Publication Data

US 2022/0078005 A1 Mar. 10, 2022

(51) Int. Cl.
*H04L 9/08* (2006.01)
*H04L 9/32* (2006.01)

(52) U.S. Cl.
CPC ........... *H04L 9/085* (2013.01); *H04L 9/0866* (2013.01); *H04L 9/32* (2013.01)

(58) Field of Classification Search
CPC ......... H04L 9/08; H04L 9/085; H04L 9/0866; H04L 9/0847; H04L 9/0861; H04L 9/0891; H04L 9/0894; H04L 9/32; H04L 9/321; H04L 63/10; H04L 63/101; H04L 63/102; H04L 63/104; H04L 63/105; H04L 63/12; G06F 21/10; G06F 21/105; G06F 21/30; G06F 21/31; G06F 21/60; G06F 21/602;

(Continued)

(56) References Cited

U.S. PATENT DOCUMENTS 11,057,210 B1 *  7/2021  Sierra ................... H04L 9/3073
11,082,220 B1 *  8/2021  Saad ..................... H04L 9/0894
(Continued)

OTHER PUBLICATIONS

Benzekki, Kamal, et al., "A Verifiable Secret Sharing Approach for Secure MultiCloud Storage," Nov. 8, 2017, Advances in Biometrics: Intl. Conf. ICB 2007, Seoul, Korea, Aug. 27-29, 2007; Proc. [Lecture Notes in Computer Science; Lect. Notes Computer], pp. 225-234 XP047454095.

(Continued)

*Primary Examiner* — Shaqueal D Wade-Wright
(74) *Attorney, Agent, or Firm* — Saul Ewing Arnstein & Lehr LLP

(57) ABSTRACT

Systems and methods for non-deterministic multi-party, multi-user sender-receiver authentication and non-repudiated resilient authorized access to secret data are described herein. In one aspect, a method for data access includes receiving, at a server, a request for data access from a user; transmitting to users, a prompt for identity verification corresponding to the identity of each user, where at least one of user is different than the user requesting data access; receiving, in response to the identity verification prompt, a plurality of identification key fragments from storage locations or devices associated with the users, where each identification key fragment is user specific; generating an organization-specific data object from the plurality of identification key fragments; confirming the organization-specific data object by the users whose identities were validated; and authorizing the request for data access based on confirming the organization-specific data object.

12 Claims, 7 Drawing Sheets

(58) Field of Classification Search
CPC . G06F 21/604; G06F 21/6209; G06F 21/6218
See application file for complete search history.

(56) References Cited

U.S. PATENT DOCUMENTS

| | | | |
|---|---|---|---|
| 2002/0071560 A1* | 6/2002 | Kurn | H04L 63/10 380/277 |
| 2013/0212393 A1 | 8/2013 | Souza | |
| 2017/0083718 A1* | 3/2017 | Peddada | G06F 21/6227 |
| 2022/0014367 A1* | 1/2022 | Law | H04L 9/3242 |

OTHER PUBLICATIONS

Bhawna, Narwal, et al., "Secured Secret Sharing and Reconstruction Algorithm for Organizations," 2018 3rd Intl. Conf. Contemporary Computing and Informatics (IC3I), IEEE, pp. 223-226 (Oct. 10, 2018) XP033721777.

* cited by examiner

SYSTEMS AND METHODS FOR NON-DETERMINISTIC MULTI-PARTY, MULTI-USER SENDER-RECEIVER AUTHENTICATION AND NON-REPUDIATABLE RESILIENT AUTHORIZED ACCESS TO SECRET DATA

BACKGROUND OF THE INVENTION

Conventional data privacy, identity and access security solutions and methods are proving ineffective at preventing hackers from stealing sensitive and valuable restricted data. The theft of sensitive data has escalated with Internet expansion into the Cloud. The wholesale migration of data from individuals, organizations and nation states into Cloud storage has increased the need for improved access security over sensitive data in addition to enhanced data privacy and resilience for on demand recovery against hacks or failure. This need will become critical as the world moves beyond Cloud to EDGE and IoT computing facilitated by faster communications such as 5G.

The world has also turned its attention to environmental concerns. The need for greater intercommunication balanced with a lower carbon and energy footprint for computing is now demanded not only by governments but is becoming a mantra for large technology players such as Amazon Web Services and Microsoft. The demand for greater social inclusion and affordability so the global community can benefit has also become a policy matter for international economic and education bodies such as the European Community, UNESCO and the IMF.

Consequently, advanced data security, resilience and recovery methods are being developed as Cloud evolution continues (e.g. U.S. patent application Ser. No. 16/845,895, titled "Systems and methods for adaptive recursive descent data redundancy"). These innovations advance the art by converging data privacy, security, recovery and resilience technologies into novel single solutions fit for the Cloud era, with an inclusive focus on resource, financial and carbon efficiency, driving improved societal benefit and affordable reach for data protection, privacy and recovery for more people and organizations.

However, without converging associated advances in non-repudiatable identity and access management these data privacy, security, resilience and recovery innovations will remain exposed to current art weaknesses in access management. The need to couple identity and access management involving people and data has remained a universal challenge. People verify their credentials with ever more sophisticated and multi-factor authentication methods as a precursor to accessing restricted data. In high security instances, this may lead to a dual control approach, or workflow process involving more "eyes on."

Nevertheless, data stored in the Cloud is exposed beyond such systems, as is any backup or copy stored. The attack vector of data stored in the Cloud as well as the limitations of existing access management systems render data more exposed generally. For example, Cloud vendors will typically control environmental security while other third parties may have roles such as backup provider or data privacy solution provider. Yet further third parties may support these service organizations for resilience, resulting in multiple copies of data existing that are not controlled by or known to the original data owner. These two limitations combine to create an unresolved data security and privacy weakness no technology in the art counters, evidenced by the constant publicity over major data breaches and a major driver behind the over 12bn Cloud records reported as compromised in 2019 and over 16bn records in the first half of 2020.

Increased remote working adds even more pressure on Cloud data and access security, as people, organizations and public services digitize and connect the social and economic fabric of global society. As more data about people, products, innovations and society becomes connected, and as organizational and national secrets and other digital assets are moved to the Cloud, often ironically to save costs and mitigate resource and skill limitations, the value of such data to hackers escalates exponentially.

To assist migration, Cloud providers adhere to a Shared Responsibility Model that many established organizations don't yet fully distinguish from traditional outsourcing models. In addition, Cloud providers provide many features and extensive functionality related to flexible Cloud store configurations, in particular related to Access Control Listings and Policies over data objects within Cloud stores that have been reported by security researchers as overly complex.

This complexity has created confusion both as to who is responsible for what in practice, and the relative priority of data security and privacy, resulting in unaddressed data security gaps from object store misconfigurations and human errors that are exploited by hackers. These have resulted in some 8.5bn Cloud records reported being compromised in 2019. Misconfiguration of Cloud stores is a significant issue. Research reports 99% of Cloud data compromise is enabled by poor or misconfigured Cloud stores and 90% of migrations to public Cloud expose sensitive data.

The accelerated move to Cloud computing has been accompanied by increased societal, regulatory and political pressure on data privacy for citizens, and for increased governmental transparency, especially in terms of the impact of emerging law enforcement on data security. Examples include the 2018 General Data Protection Regulation (GDPR) in Europe, the 2020 California Consumer Privacy Act (CCPA), and the US Cloud Act, 2018. Consequently, data compromises involving identifiable personal citizen data are notifiable events to Information Commission Regulators under legislation and may result in hefty fines and censure for organizations accountable for the privacy of that data, irrespective of how that data is compromised, or critically, whether it was encrypted or not. US laws now extend to data held in US technology providers' storage whether in the US or not, creating significant privacy concerns for people, organizations and governments.

These regulations have created additional challenges on how to maintain sensitive data and economically valuable data secure for organizations that have custody of sensitive economic, customer or state secrets. Additional criticism of Cloud providers' access security systems relates to poorly understood features that enable "all authenticated" users to access Object Stores and the data objects within them. This is an unfortunate consequence of Cloud provider efforts to provide flexibility but raises the unresolved requirement for more advanced access security methods that protect legitimate users and organizations against hackers knowledgeable about the implications of such features when errors or misconfigurations result in data exposure.

A common problem even amongst technology security professionals is that encryption provides insufficient protection to assure against data privacy leaks especially in a more complex Cloud environment. In this respect, data privacy in the Cloud needs advances that data security in the art today cannot provide, where encrypted data theft results in organizational disclosure and reprimand.

Additionally, identity compromise of legitimate actors' credentials, due to poor credential management, human error or sophisticated hacker attacks has resulted in significant exposure of personal and confidential data of individuals, organizations and nation states. Legitimate actors have also abused their trusted position and deliberately used their credentials to exfiltrate sensitive data in the name of public interest, transparency and free expression.

Such acts compromise access and data security where otherwise restricted data is compromised by actors with legitimate credentials but rogue motives. Moreover, escalating state sponsored data hacks and exfiltration of government data has increased as a result of the inability of existing data and access security to protect Cloud data whether or not it is stored under the control of its owner.

A new approach is required for the "always on, work anywhere" Cloud-connected world to protect data privacy and assure its secure storage and "on demand" recovery by legitimate parties against technology, storage or access disruption. One that builds upon and assures data confidentiality adhering to basic principles of: (1) access security, to avert intruders and those masquerading as legitimate actors; (2) integrity, to verify the authenticity of legitimate actors, and assure data is protected against compromise by one or more outside hackers or trusted actors gone rogue; and (3) nonrepudiation, to ensure that any sender party or receiver party cannot falsely deny being involved in accessing sensitive data.

The approach requires above all to mitigate and prevent threats from internal rogue actors abusing their access credentials, from individual human error and from determined external hackers determined to compromise sensitive or secret data. The approach needs to ensure the authenticity, integrity and nonrepudiation both of parties that own/have custody of sensitive data, and of parties responsible for its protection and privacy when stored at rest in Cloud or other storage, or in transit.

SUMMARY OF THE INVENTION

The system, apparatus, and technical effects described herein combine one or more methods of data security, privacy, resilience, and recovery together with multi-party, multi-user personal, non-deterministic and non-repudiatable identity verification, access management and authorization. This combination provides a dynamic, unpredictable approach whereby one or more mutually exclusive organizations and one or more system provider organizations can validate actors and authorize data access, data upload, retrieval, and the like. These data-related actions can occur based on the identity verification of 2 or more authorized individuals from a mutually exclusive organization and a system provider organization. The authorized individuals can include any combination from all authorized users as dynamically authorized from time to time for each mutually exclusive organization and each system provider organization.

The authorized individuals can include any subset of authorized individuals for a mutually exclusive organization, a system provider organization, or both, and may require one or more specified authorized users or specified "mandatory" authorized users from each mutually exclusive organization or each system provider organization to form part of such sub set.

Once the identities of the 2 or more individuals from the mutually exclusive organization are verified, the system provider is notified by the system. Once the identities of the 2 or more authorized individuals of the system provider organization are verified, the mutually exclusive organization is notified by the system.

Only when the identities of the 2 or more authorized individuals from each mutually exclusive organization and each system provider organization are verified, and confirmations are acknowledged, will the link between the organizations be authorized for data access or upload or retrieval.

The technical effect of this approach is to engineer access security for sensitive data that is dynamically set and customizable for organizations by policy or operating parameters for valid subsets of authorized individuals from mutually exclusive customer and system provider organizations responsible for customer data protection. It facilitates different levels of access security for authorized individuals and for valid, dynamically changeable subsets of authorized individuals from each organization.

Dynamic security levels can thereby be set according to policies for data upload, retrieval, volume of upload or retrieval, data deletion, movement or other policies or parameters to protect the privacy and security of data from inside compromise by organizational or system provider users or external hackers.

In addition, policy-set monitoring, alerts and preventative data protection and privacy measures can be proactively implemented where specific operating parameters are breached, for example where large or unusual volumes or types or patterns of data are requested by otherwise valid organizational actors. The system provider or its automated technology and systems can then act proactively to protect and ensure the integrity and security of data and the system.

Policies, Operating Parameters, Valid Subsets of Authorized Users and Identification Keys Policies may be set and operating parameters input into the system in respect of valid sets or subsets of authorized users of the system. These may include the total number of authorized users for each mutually exclusive organization and each system provider organization, or the minimum subset of authorized users of each mutually exclusive organization and each system provider organization, or one or more specified authorized users or mandatory authorized users of each mutually exclusive organization or each system provider organization. Operating parameters may include commercial, risk, geographic, regulatory, organizational governance, trust, sovereignty, time or data sensitivity or privacy or other data-related parameters.

Each mutually exclusive organization and each system provider organization will set and maintain operating parameters dynamically as necessary via a system policy portal, in accordance with commercial, risk, geographic, regulatory, organizational governance, trust, data residency or sovereignty, time or data sensitivity or privacy or other data-related considerations from time to time.

The system may use operating parameters input dynamically to monitor, implement, recommend, set, or the like, a minimum valid level of access security for authorized users for each mutually exclusive organization or each system provider organization. Thresholds may be dynamically adjusted by event-driven updates or maintenance of operating parameters by each mutually exclusive organization or by each system provider organization from time to time.

Alternatively, with or without input of operating parameters, the system may generate a minimum total number and minimum subset number of authorized users for each mutually exclusive organization or each system provider organization in order to protect the security, integrity and resilience of the system and its data.

Alternatively, the system may generate a minimum access security level required for each authorized user of each mutually exclusive organization or each system provider organization, based on parameters input to or maintained by the system.

In each case, the system will generate a number of Identification Keys equal to, or greater than, the number of authorized users in each mutually exclusive organization. Each Identification Key will be generated from a secret data object known only to and provided by each mutually exclusive organization or group representing one or more mutually exclusive organizations or associated parties. These may include regulators or auditors or other third parties.

In addition, the system will generate a number of Identification Keys equal to, or greater than, the number of authorized users of each system provider organization. Each Identification Key will be generated from a secret data object known only to and provided by each system provider organization or group representing one or more system providers. These may include third parties such as regulators or auditors or other third parties.

Secret data objects may be any discrete electronic datum, such as a digital picture or photograph or representation, document, graphic, written or diagrammatic file or formula or recipe or other form, scanned or otherwise generated, digitally created or enhanced. Secret data objects may have a secret and restricted relevance to the corresponding mutually exclusive organization or system provider organization and would be recognised by the authorized users of the corresponding mutually exclusive organization or system provider organization as appropriate. Secret data objects may be common or shared or agreed amongst common parties to facilitate data access to sensitive data or be separate by party or a combination thereof.

Secret data objects are converted into Identification Keys by the system. The system may use data fragmentation, sharding, erasure coding, disintegration, striping techniques, or other data splitting methods, or a combination thereof, to generate the Identification Keys. Examples of Identification Key generation techniques can include threshold based secret sharing algorithms dynamically selected by the system, or other methods of data fragmentation, sharding, erasure coding, disintegration, striping or other data splitting methods that build in redundancy, preferably to the data object level. Identification Keys may be encrypted, hashed, deidentified or secured and obfuscated in other ways typical in the art such as tokenization. The system may preferably use Quantum Fragmentation techniques for advanced data privacy, resilience and recovery (e.g. as described in U.S. patent application Ser. No. 16/845,895, titled "Systems and methods for adaptive recursive descent data redundancy").

The system can generate Identification Keys for all individual authorized users of a mutually exclusive organization or a system provider organization. The system can also determine the minimum number of authorized users in each mutually exclusive organization or each system provider organization whose identities require to be verified in a non-repudiatable manner as a precursor for authorization of data access, upload or retrieval. The system will do so dynamically for data owned by a mutually exclusive organization based on the operating parameters input by each mutually exclusive organization, or alternatively by a system determination based on system analyzed operating parameters.

Identification Keys and User Access Accounts

Identification Keys generated will be stored by the system for each authorized user of a mutually exclusive organization. The user access portal will allocate at least one Identification Key related to each authorized user depending on the organization policy and store it in one of a plurality of storage locations and types. The system will only permit recovery of stored Identification Keys as appropriate for system processing after valid identity verification of at least the minimum subset of corresponding authorized users of a mutually exclusive organization necessary to recover enough Identification Keys to regenerate the secret data object.

On successful identity verification of at least a minimum subset of authorized users, Identification Keys will be retrieved by the system for recreation of the secret data object for that mutually exclusive organization using techniques such as Quantum Fragmentation (e.g. as discussed in U.S. patent application Ser. No. 16/845,895, titled "Systems and methods for adaptive recursive descent data redundancy").

The secret data object will be recreated once a minimum subset of Identification Keys is recovered by the system. Identification Keys beyond this number that are not required provide resilience against data loss, and increased security against data privacy breaches.

Once recreated, the system will transmit a request to the authorized users of the mutually exclusive organization to verify their identities in accordance with system policies. The secret data object will be transmitted to each of the verified users for confirmation via the system user access portal.

Once confirmation has been acknowledged, confirming nonrepudiation of each user after identity verification via their respective user access portal, confirmations will be transmitted from each verified user's user access portal back to the system.

Once the system has received confirmation after verification from at least a minimum subset of authorized users, the system will recognize a valid data access request has been registered.

The system will then request system provider authorized users to verify their identities into the system user access portal.

On successful identity verification of at least a minimum subset of authorized users, Identification Keys will be retrieved by the system for recreation of the secret data object for that system provider organization using techniques such as Quantum Fragmentation (e.g. as discussed in U.S. patent application Ser. No. 16/845,895, titled "Systems and methods for adaptive recursive descent data redundancy").

The secret data object will be recreated once a minimum subset of Identification Keys is recovered by the system. Identification Keys beyond this number that are not required provide resilience against data loss, and increased security against data privacy breaches.

Once recreated, the system will transmit a request to the authorized users of the system provider organization to verify their identities in accordance with system policies. The secret data object will be transmitted to each of the verified users for confirmation via the system user access portal.

Once confirmation has been acknowledged, confirming nonrepudiation of each user after identity verification via their respective user access portal, confirmations will be transmitted from each verified user's user access portal back to the system.

Once the system has received confirmation after verification from at least a minimum subset of authorized users, the system will recognize a valid data access grant has been registered.

Once all confirmations necessary are received from at least a minimum subset of verified users from the mutually exclusive organization and from at least a minimum subset of verified users from the system provider organization, the system can subsequently allow access to the data held for that mutually exclusive organization.

User Verification

The system herein allows an authorized user of a mutually exclusive organization or system provider organization to verify the user's identity in a non-repudiatable manner using a selectable, changeable, personal authentication construct, including out-of-band authentication using one or more devices and/or tokens, and locations, including multi-factor authentication methods combining two or more methods.

Additionally, each authorized user may personalize the user access portal to provide familiarity, ease of use and a further security feature.

Each authorized user's personal authentication construct is mutually exclusive of that of any other user.

Methods, Devices, Tokens, Media, Communications Channels, Locations and Other Means of Verifying Identity Authentication methods may include, but are not constrained by: passwords; pass phrases or sentences, including single or two or multi-factor authentication using passwords, passphrases, codes, PINs and SMS text or alphanumeric codes; PIN, SMS or text or alphanumeric code; picture images including patterns and sequences of pictures, shapes, colors, icons and other pattern representations; dynamic challenges according to policy-driven or user-selectable scenarios of icon, picture, shapes, color, or other pattern representation matching including sequences; CAPTCHA or biometrics including one or more fingerprints or hand recognitions, facial recognition with or without liveness detection, iris or retina recognition, voice recognition with or without voice to text recognition, and behavioral biometrics such as pulse or heartbeat recognition, keyboard patterns or other passive behavioral attributes of a user.

Devices may be personal, adaptable, or assignable to the authorized user, including devices with accessible media and communications, including computers, laptops, smartphones, tablets, smart watches, IoT devices, computer hardware with a user input capability directly, remotely or by attachment to other computerized device, including biometric readers, other hardware devices such as an authentication controlled safe, hardware or software user authentication such as RSA token devices and code generation applications, or other devices with user or device readable output capability such as a signal processor, light processor or screen or code readers, and memory and processing capability to process, store and communicate inputs and outputs related to user authentication, storage, and transfer of Identification Keys.

Devices may be provided by each mutually exclusive organization or each system provider organization for use by authorized users, including access to storage in organizational data centers, servers, Cloud storage, satellites, or other organization accessible or connected or supplied devices.

Additionally, devices may include USB flash drives, memory cards or other computer readable device that can be encrypted and/or protected by password, passphrase, code or other method used by authorized users to access the contents of such devices.

Additionally, devices may be accessible by One Time Passwords or Passcodes generated after input of a provided code, with or without an associated card reader or bar code or QR code reader, or card input or PIN code by the authorized user, such as an RSA device or access card or smart card.

Additionally, devices may include physical media for storing a secret code or codes revealed on removal of scratch card covers concealing the code or codes or devices or applications that generate codes for printing and safekeeping by authorized users.

Authentication methods may be processed and verified across one or more devices and communications channels. For example, an authorized user may input a passphrase via computer web browser, which may be transmitted over Ethernet or WiFi across the Internet to the system for verification. Another authorized user may select a voice biometric via a tablet application with voice verification following an out-of-band call from an IVR system component to a selected mobile phone, landline, or Skype phone, or web session or other selected call reception capability the authorized user selected as a component of a personal authentication construct.

Devices may have different electronic communications capabilities, including WiFi, Ethernet, Bluetooth, NFC, SMS, 4G or LTE or 5G, public telephone network, PSTN, satellite communications, microwave, LiFi or other electronic fixed or air, short or long-distance communications method available in the art. Devices may also be identified uniquely as associated with an authorized user providing added assurance as to integrity and nonrepudiation. For example, smart phones and IoT devices store unique identities such as UUIDs, GUIDs, IMIEs, mac addresses, static IDs and verifiable serial numbers that may be registered against a unique authorized user's user access account.

Additionally, devices may be allocated proxy identification tags by authorized users for ease of use, for personalization and for added security. For example, an authorized user's mobile phone may be tagged "Anne's cellphone," or "Cell1," or "Dolly," or other tags known and personal to the authorized user and added to a personal authentication construct.

Computer media includes computer readable hard drives, removable or flash drives, CD, DVD, other flash memory, USB drives, or other media stored on devices accessible to an authorized user including smart devices such as smart TVs, watches, cameras, IoT devices, exercise watches, or other devices.

Tokens include codes generated by devices such as RSA devices or RSA applications or other applications processed on smart phones. Alternatively, tokens can be generated from web browser applications, desktop or mobile applications via email or text for out-of-band verification or time-based delay for added assurances that the user is legitimate.

Authorized User Verification, Storage of Identification Keys and SubKeys

The system described provides user access accounts for an authorized user of a mutually exclusive organization or a system provider organization. The user access portal will allow each authorized user to verify the user's identity using a personal authentication construct including a dynamic, personal, selectable, changeable sequence of one or more authentication methods as described previously herein.

By combining the described identity verification method and apparatus described herein for at least a set of authorized users of a mutually exclusive organization or system provider organization, multi-user identity verification is required before access to organization sensitive data is authorized. This can eliminate the threat from one or more rogue users or access security misconfiguration or human error of one or more users up to at least a minimum subset of users required for any mutually exclusive organization or system provider organization.

The system user access portal enables authorized users to select, change and manage personal authentication constructs previously described herein.

Additionally, authorized users may add authentication methods to enhance the non-deterministic security and unpredictability associated with the authorized user's personal authentication construct.

An authorized user of a mutually exclusive organization or system provider organization can manage personal authentication constructs and verify identity through their user access portal. The user access portal can additionally maintain access to a plurality of secure storage facilities into which any Identification Keys associated with the authorized user can be linked or referenced or matched or stored.

Each Identification Key will be stored by the system in the same manner as the secret data object that generated each Identification Key, ensuring that Identification Keys stored at rest and in transit are fragmented, sharded, erasure coded, disintegrated, split or striped or otherwise decomposed into a plurality of SubKeys persisted to secure, private, distributed storage locations and types and devices are anonymous and without context as to ownership or content. The system creates more SubKeys from each Identification Key than is necessary to recreate the corresponding Identification Key building resilience against compromise or disruption or failure of device storage, storage location or Cloud store.

SubKeys will be generated by the system, preferably using advanced data fragmentation such as Quantum Fragmentation as used by the Adaptive Recursive Descent method for data privacy, resilience and recovery (e.g. as described in U.S. patent application Ser. No. 16/845,895, titled "Systems and methods for adaptive recursive descent data redundancy").

Authorized users may additionally be able to access their personal user access portal to select, change and manage personal locations, devices or technologies where one or more SubKeys may be persisted to a system set limit that at all times ensures system integrity, nonrepudiation and resilience. This may be a system configured subset of locations for storage to ensure overall system integrity, security and privacy is maintained.

For example, an authorized user may select one or more personal Cloud storage accounts, or a personal computer, a laptop, an NAS drive, a tablet, a mobile phone, or smart device with accessible storage. Additionally, an authorized user may select a personal USB or flash drive, or IoT storage device or other personal device or storage media that can be accessed by the system for SubKey storage and retrieval.

While persisted across multiple locations unpredictable to outsiders as secure, private, anonymous datum without any ownership or content context, SubKeys are worthless to hackers. SubKeys are only recalled by the system for reconstitution into Identification Keys when at least a minimum subset of authorized users verify identity after which SubKeys from verified users are recombined from user selected locations, devices or technologies, and from system locations, devices or technologies as previously described, to recreate the Identification Keys.

Additionally, the system can proactively monitor latency of recreation of Identification Keys to protect data against insider compromise and duress scenarios in which one or more authorized users may be compromised. Where latency related to system requests for recreation of Identification Keys, or Identification Keys related to system requests for recreation of secret data objects exceeds system set thresholds, the system provider organization and each mutually exclusive organization are alerted, and data access prevented.

The creation and recreation of SubKeys and Identification Keys are dependent upon individual authorized users interacting with the system and applying non-deterministic personal authentication constructs that align with their personal choices and behaviors. This identity verification can render the system unpredictable to hackers and impregnable to multiple rogue legitimate actors acting in concert, including up to an otherwise valid set of authorized users of a mutually exclusive organization or an otherwise valid set of authorized users of a system provider organization and, as required for legitimate authority, an otherwise valid set of mandatory authorized users of a mutually exclusive organization and an otherwise valid set of mandatory authorized users of a system provider organization.

Specified Individual Users for Added Access Security

A further technical effect of the systems and methods described herein is the additional access security provided where one or more authorized users of a mutually exclusive organization or system provider organization are mandatory members of a set or subset of authorized users required to verify their identity.

In such cases, the system will generate separate Identification Keys, one or more of which will be allocated to mandatory authorized users to ensure that identity verification of a requisite minimum subset of mandatory authorized users is assured. The policies, methods, operating parameters and process related to the registration, authentication and verification of mandatory authorized users or authorized users and the input, storage, deconstruction and reconstitution, and confirmation of secret data objects for mandatory authorized users or authorized users is as described herein.

Data access, upload or retrieval will only be allowed by the system where both a valid set of mandatory authorized users and a valid set of authorized users of a mutually exclusive organization and system provider organization are verified.

Mandatory authorized user sets may form a subset of the set of authorized users of a mutually exclusive organization or of a system provider organization required to be verified to confirm secret data objects as valid.

Alternatively, mandatory authorized user subsets may form a separate subset from the subset of authorized users of mutually exclusive organizations or of system provider organizations required to be identity verified and to confirm secret data objects as valid.

Multiple Mutually Exclusive Organizations and System Provider Organizations

The system and methods described herein can be extended to multiple mutually exclusive organizations requesting data access for upload, retrieval or other data services, and multiple system provider organizations hosting the system or a version thereof. This extension allows for many organizations to interact with one another across the global Cloud network in securely, privately and resiliently accessing, uploading, retrieving or sharing sensitive or highly confidential secrets or data using the described system, apparatus and methods.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
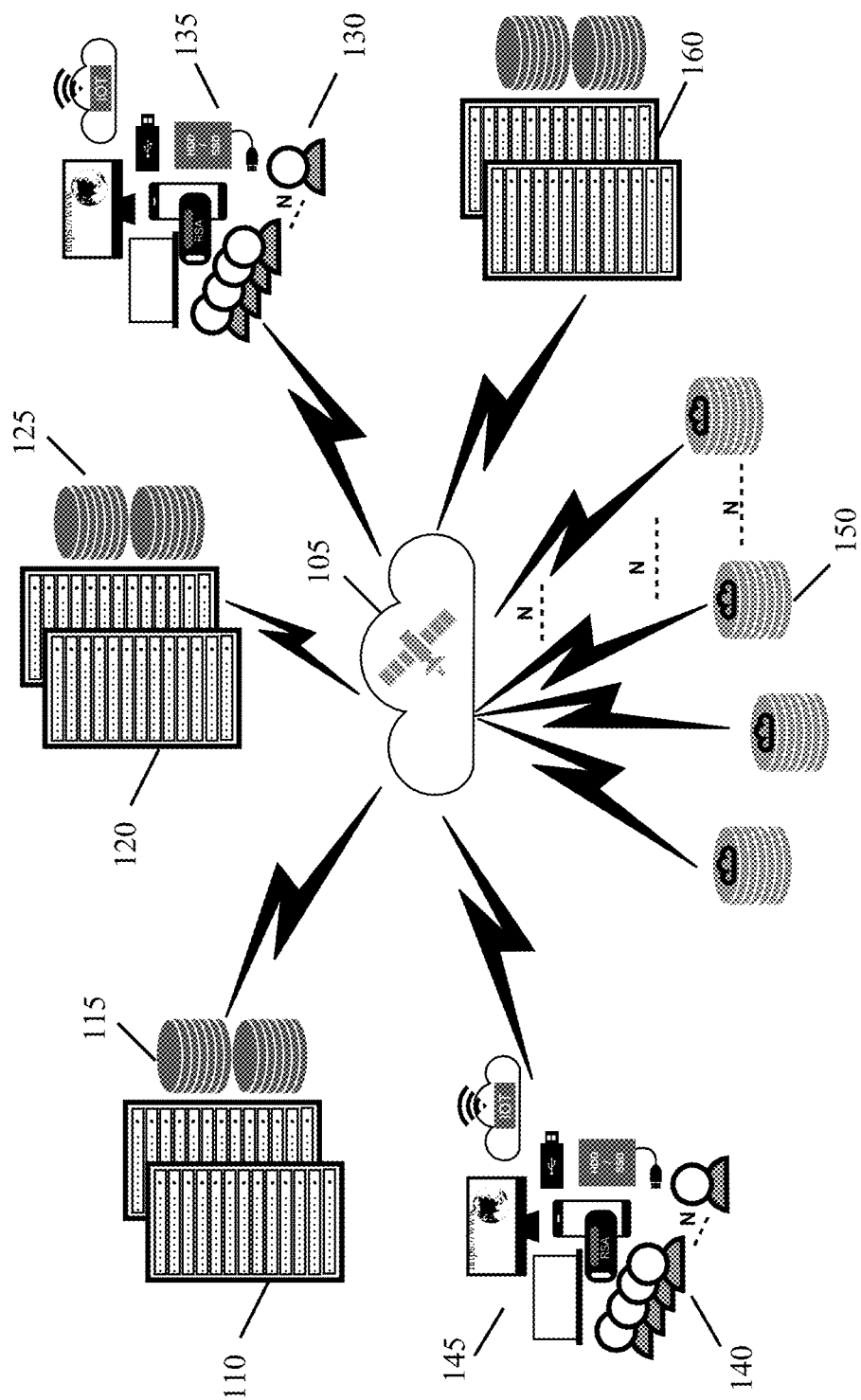
FIG. 1 depicts a system for non-deterministic multi-party, multi-user sender-receiver authentication and non-repudiated resilient authorized access to secret or sensitive or restricted data according to an embodiment of the claimed invention.

The claimed invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly indicates otherwise).

As used in the specification and claims, the terms "Identification keys," "SubKeys," "fragments," "shards," "datum" and the like represent the outcome of splitting, dissolution, parting, striping, sharding, erasure coding, crumbling, shattering or other means of dividing an individual data object or file into a plurality of pieces, including sufficient extra pieces to provide adequate resilience against loss of one or more of the plurality of pieces, that can thereafter be combined to recreate the individual data object or file.

Adaptive Recursive Descent (ARD)—this concept describes the process of utilizing the well-understood model of recursion from Computer Science and extending it to permit a non-deterministic adaptive capability both in the recursive descent and the resolution through ascent. Traditionally, these stack-based approaches are deterministic, offering no potential for variation in the outcome as the resolution through ascent is determined by the fixed model of each function utilized in the descent. In ARD, the model of a function utilized in the descent can be varied in the ascent through policy variation, polymorphism, or parameterization derived from contextual variations.

Quantum Fragmentation—this concept is not derived from the current models of Quantum Physics, but rooted in the original concepts of quanta, as variably defined values or amounts based on the rules or policies governing an action or transaction. In this context, Quantum Fragmentation describes a process by which the reduction of a datum into fragments or shards can be variably and dynamically defined, in terms of the size or number of the fragments or shards for each datum, or even within a single datum.

Authorized user—is a unique, specified user by name, access credentials, username or other unique identifier defined by system policy as an authorized user. Authorized users are required to verify their identity as one of a number of authorized users, any specific or minimum subset of whom are required to verify their identity as a precursor to the system recovering Identification Keys for reconstitution into a secret data object, or SubKeys for reconstruction into Identification Keys where Adaptive Recursive Descent may be applied, the authorized user being mutually exclusive from all other authorized users.

Mandatory authorized user—is a unique, specified user by name, access credentials, username or other unique identifier defined by system policy as a mandatory authorized user. A minimum subset of mandatory authorized users are required to verify their identity as a precursor to the system recovering Identification Keys or SubKeys for reconstruction into a secret data object. Where a mandatory authorized user is also an authorized user, the user may be required by system policy to authenticate and verify identity mutually exclusively as a mandatory authorized user apart from an authorized user.

Group of users—is a unique, specified group of at least one authorized user or at least one mandatory authorized user, whose access credentials are associated by user group name. Access credentials, usernames, or other unique identifiers required to verify the identity of a user in each group of users are used as a precursor to the system retrieving Identification Keys or SubKeys for reconstitution into a secret data object.

Mandatory step-up—consists of additional identity verification for a user or group of users initiated by the system on occurrence of events specified by system policy or operating parameters. The system will only allocate Identification Keys or SubKeys, or recover Identification Keys or SubKeys, or allocate secret data objects for confirmation, or allow access to data services after valid verification of at least a minimum subset or specified number of users required to validate the mandatory step up criteria.

Storage location—is any location able to store data persisted by the system from time to time, including on devices, system storage, mutually exclusive organization or system provider organization storage such as datacenters, or third party storage or Cloud provider storage, including regional storage or other distinct Cloud or other storage area, typically geographically bound such as US-East, US-West, US-Central, EU-West, Asia-Pacific, which may be known under different descriptions depending on the Cloud vendor or data storage provider. Cloud regions may be public, private, hybrid or other configured data stores accessible via an internet Application Program Interface (API) or other access method.

Personal authentication construct—is a user personal identity verification configuration as herein defined exclusive to a user for verifying the user's identity using a dynamic, personal, selectable, changeable, sequence of one or more authentication methods such as: tokens, devices personal or adaptable or assignable to the authorized user, communication channels, including used in out-of-band authentication using one or more devices and/or tokens, and locations, including multi-factor authentication methods combining two or more methods. Methods include passwords, passphrases, code or other logical sequence; biometrics such as fingerprint, face recognition with or without liveness detection, handprints, retina or iris or other physiological or behavioral characteristic capable of being attributed to an individual; CAPTCHA-type; pattern sequences; gamification or other behavior or habit-based methods.

The personal authentication construct additionally allows for personalization of a user's access portal for identity verification to provide familiarity, ease of use and a further security feature. The personal authentication construct may be configured for identity verification and for mandatory step-up verification.

DETAILED DESCRIPTION OF THE INVENTION

Methods and systems described herein relate to non-deterministic multi-party, multi-user sender-receiver authentication and non-repudiated resilient authorized access to and sharing of secret, sensitive, or restricted data.

The system, apparatus, and technical effects described herein provide for one or more mutually exclusive organizations to upload, recover or otherwise access data after a specified minimum set of mandatory authorized users or authorized users have verified their identity. The identity verification acts as a precursor to the system recovering a set of persisted, distributed, and stored Identification Keys or SubKeys for reconfiguration by the system into a secret data object. The secret data object can be previously fragmented into the Identification Keys or SubKeys by the system and persisted as a plurality of fragments to distributed data stores, the plurality of fragments being more than the any minimum subset of fragments required to reconfigure the secret data object. This can enhance resilience and security preferably at the granular data object level, the reconfigured secret data object being confirmed as valid by the specified minimum set of mandatory authorized users or authorized users.

FIG. 1 illustrates a system for non-deterministic multi-party, multi-user sender-receiver verification and non-repudiated resilient authorized access to secret, sensitive, or restricted data according to an embodiment of the claimed invention. The system may include a network 105; system provider server and memory, storage databases or other data stores 110 and 115; mutually exclusive organization server and memory, storage databases or other data stores 120 and 125. Databases can include relational, non-relational, or other database stores. Data stores can include file, object or block storage and other storage such as network attached storage (NAS) or storage area network (SAN), memory or cache stores, including data generated from in-memory applications, or other data stores.

The system may be used by mutually exclusive organization authorized users or mandatory authorized users 130, or system provider authorized users or mandatory authorized users 140. The system may also include mutually exclusive organization authorized user or mandatory authorized user devices 135, and system provider authorized user or mandatory authorized user devices 145.

Devices 135 and 145 can include personal devices or devices adaptable or assignable to an authorized user, including computers, laptops, smartphones, tablets, smart watches, IoT devices, computer hardware with a user input capability (e.g., biometric readers and the like), computer hardware with user readable output capability (e.g., a reader, a screen, and the like), or memory and processing capability to process, store and communicate inputs and outputs. Alternatively or in addition, devices can be provided by a mutually exclusive organization or system provider organization for use by authorized users or mandatory authorized users, including access to storage in organizational data centers, servers, Cloud storage, satellites, or other accessible or connected or supplied devices.

Devices can also include USB flash drives, memory cards or other computer readable devices that can be encrypted or protected by password, passphrase, code or other method used by users to access the contents of such devices.

Devices can also include an RSA device, code generation application such as for bar or QR codes, card reader, or other devices with user readable output capability such as a signal processor, light processor or screen, and memory and processing capability to process, store and communicate inputs and outputs related to user authentication, storage, and transfer of Identification Keys.

Devices can also include physical media containing secret code or codes, such as scratch card covers concealing a code, or devices or applications that generate codes for printing and safekeeping by users.

Devices used or accessed by authorized or mandatory authorized users can be any type of electronic device capable of connecting a user to the network 105, accessing or hosting applications or web browsers connected via Internet Protocol or other communications means.

Devices 135, 145 can access the network 105 to communicate with other entities of the system. Preferably, the network 105 is a secure network, and may require authentication, verification and authorization by the user device 135, 145 prior to granting access. Devices 135, 145 may in some cases upload data objects or files to, or recover data objects or files from, or otherwise access data objects or files via the network 105.

In some cases, the data objects or files may be locally stored (e.g., on a user device 135, 145). Alternatively, the data objects or files may be stored over the network 105, for example by a database, cache or other data store 115, 125, 150 etc. Data stores may be located anywhere and belong to a mutually exclusive organization, system provider organization or other party, such as Cloud providers or third-party storage providers (e.g., other parties that manage storage 150).

Authentication service providers 160 can provide identity authentication and verification functions for authorized users and mandatory authorized users, including verification of user identity.

Figure 2:
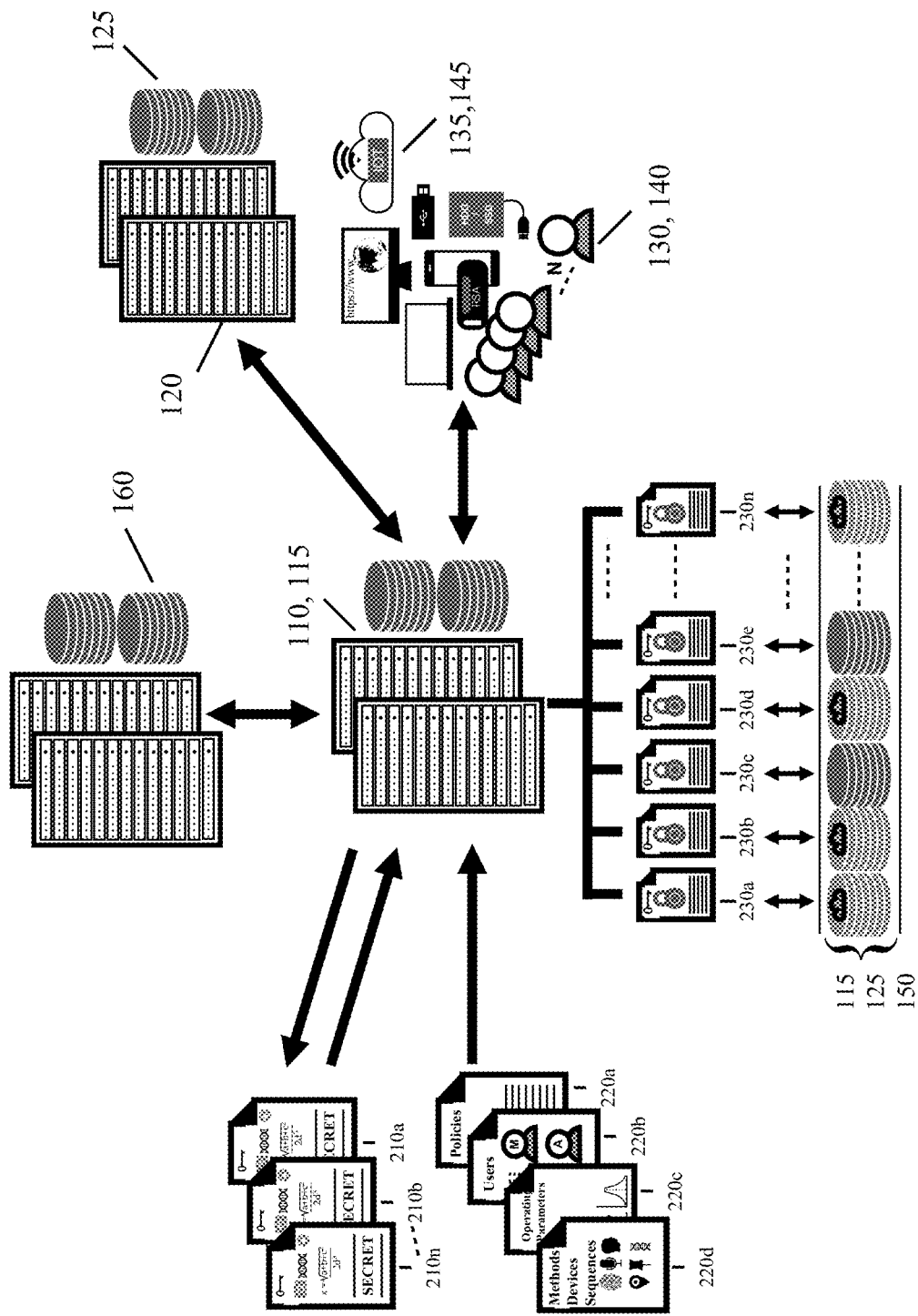
FIG. 2 depicts a system for setting-up users or creating and dynamically persisting Identification Keys to distributed storage from secret data objects according to an embodiment of the claimed invention.

FIG. 2 depicts a system for setting-up of users and Identification Keys according to an embodiment of the claimed invention.

Authorized users and mandatory authorized users of a mutually exclusive organization or system provider organization 130, 140, can be registered with the system provider server and storage 110, 115 through a user access portal accessible from the system provider server and storage 110, 115 or mutually exclusive organization system and storage 120, 125. User registration can include user identity information 220*b*, such as username, given and surname, identifying characteristics, government issued identification information such as social security number, passport, driver license and the like, or other characteristics such as employee reference or a personal identifier and the like. Authentication methods, devices and sequence combinations, 220*d* can also be registered with and stored by the system provider server and storage 110, 115, or mutually exclusive organization system and storage 120, 125, including operating parameters 220*c*, associated with authentication methods, devices and sequences used for identity verification.

Each mutually exclusive organization or system provider organization can set policies, 220*a*, related to the registration and verification of authorized users, and for the input, storage, fragmentation, recreation, and confirmation of secret data objects.

Each mutually exclusive organization or system provider organization can also set operating parameters 220*c*, for authentication methods, devices, or sequences used for verification of user identities, such as session limits, password conventions and parameters related to data sensitivity, governance, sovereignty and the like. In addition, operating parameters can be set for Identification Key and SubKey generation such as level of resilience, data security, sensitivity, size, residency and the like. Methods, devices, sequences and operating parameters for users, Identification Keys and SubKeys are created, maintained, changed and controlled by system policies 220*a*.

Figure 5:
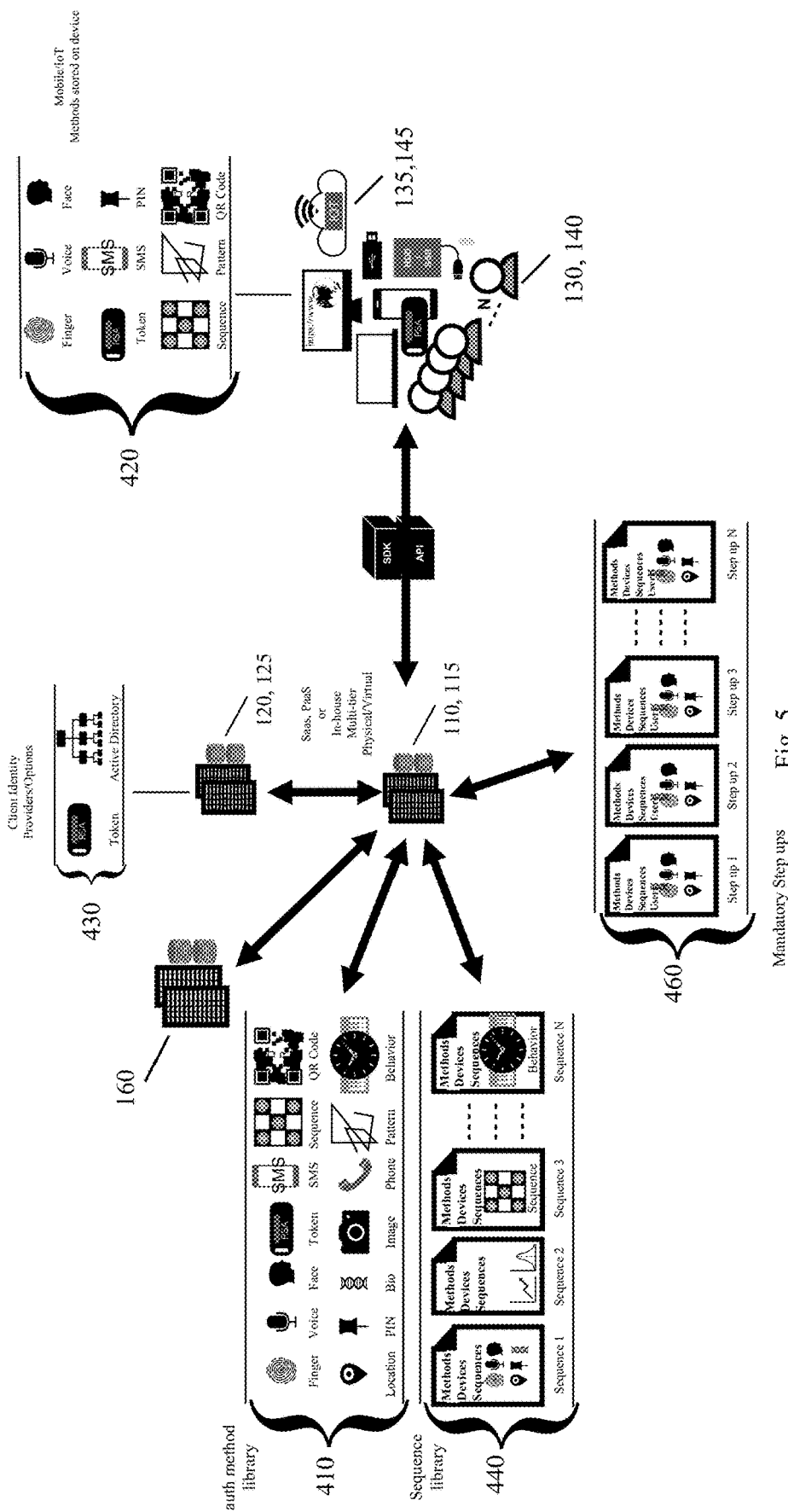
FIG. 5 depicts a workflow process for non-deterministic identity verification in a non-repudiatable manner of a set of users of a mutually exclusive organization or system provider organization according to embodiments of the claimed invention.

Authorized or mandatory authorized users of a mutually exclusive organization or system provider organization 130, 140, can select, register, change, manage or adapt one or more of a plurality of authentication methods or devices, including those supplied by a mutually exclusive organization 120, 125, or system provider organization 110, 115, or authentication service provider 160, into one or more personal authentication constructs configured by the corresponding user, creating a non-deterministic, unpredictable authentication construct, described more fully by FIG. 5 herein.

Each mutually exclusive organization or system provider organization can register one or more secret data objects 210*a*, 210*b*, . . . 210*n*, to the system known only to and provided by the organization and its authorized users or mandatory authorized users.

In one embodiment of the claimed invention, one or more secret data objects 210*a* . . . 210*n*, may be registered with the system provider server and storage 110, 115, to differentiate authorized users or mandatory authorized users of mutually exclusive organizations or system provider organizations or a combination thereof.

Figure 3:
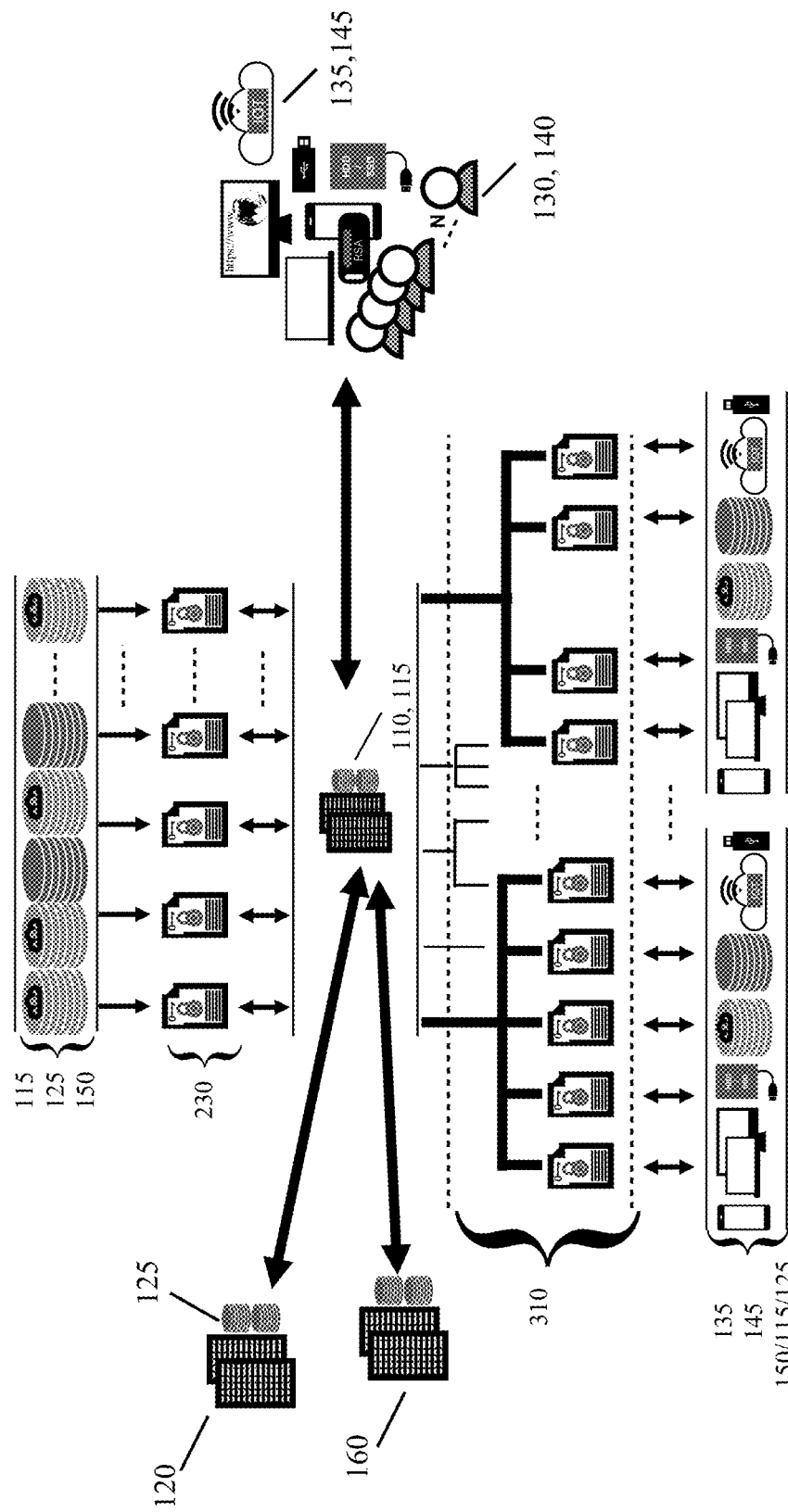
FIG. 3 depicts a workflow process for the allocation of Identification Keys and creation and dynamic persistence of SubKeys to distributed data stores or locations for authorized users of mutually exclusive organizations or system provider organizations according to an embodiment of the claimed invention.

In another embodiment, one or more secret data objects 210*a* . . . 210*n*, may be registered with the system provider server and storage 110, 115 and fragmented by Quantum Fragmentation techniques in line with system policies 220*a*, or operating parameters 220*c*, as a plurality of Identification Keys or SubKeys as described herein into distributed data stores 115, 125, 150, to be allocated after identity verification as described herein in FIG. 3 to authorized users or mandatory authorized users of one or more mutually exclusive organizations or system provider organizations or a combination thereof, such as in organizational groups or associations, the plurality of fragments being more than the any minimum subset of fragments required to reconfigure the secret data object.

A secret data object may be any discrete electronic datum, such as a digital picture or photograph or representation, document, graphic, written or diagrammatic file or formula or recipe or other form, scanned or otherwise generated, digitally created or enhanced. The secret data object may be formed from a combination of other documents or document or data types creating a customized secret data object unique to the mutually exclusive organization or system provider organization or other combination.

Data objects may include a secret of restricted relevance to each mutually exclusive organization or system provider organization, or a combination of mutually exclusive organizations or system provider organizations, which may be recognised by the authorized users or mandatory authorized users or authorized or mandatory user groups of the corresponding combination of one or more mutually exclusive organizations or system provider organizations as appropriate.

Once registered with the system provider server and storage 110, 115, the system provider server 110 can generate a set of Identification Keys. Once a set of authorized and/or mandatory authorized users are registered that satisfies a minimum threshold in accordance with system policy 220*a*, or operating parameters 220*c*, the system provider server 110 can convert the secret data object or each of the secret data objects 210*a*, 210*b*, . . . 210*n*, as appropriate into a set of Identification Keys 230*a*, 230*b*, 230*c*, 230*d*, 230*e* . . . 230*n*, equal to or greater than the number of authorized users and mandatory authorized users in total "n," for the mutually exclusive organization, system provider organization or combination thereof.

Once created, the system can persist each Identification Key to a data store 115, 125, 150, in accordance with the system policy or policies 220*a*, or operating parameters 220*c*, for Identification Key creation and persistence. Data stores may be hosted by storage of a system provider 115, mutually exclusive storage 125, or Cloud provider or third-party storage provider storage 150. Policies and operating parameters for converting secret data objects into a set of Identification Keys is organization, combination of organizations or user group specific and unpredictable insofar as the total number of Identification Keys created and the any minimum set number needed to recreate the secret data object.

In some circumstances, at least one or more Identification Keys greater than the number of authorized users or mandatory authorized users may be generated. In other circumstances, at least one or more Identification Keys more than the minimum set of authorized or mandatory authorized users required to authenticate and verify identity may be needed to recreate the secret data object.

FIG. 3 describes the process for allocation of Identification Keys and SubKeys to data stores or locations for users of mutually exclusive organizations or system provider organizations according to an embodiment of the claimed invention.

Registered authorized users or mandatory authorized users (FIG. 2, 220*b*) of a mutually exclusive organization or system provider organization can verify their identity using personal authentication constructs, preferably in sequences of one or more authentication methods (FIG. 2, 220*d*), available from or stored by a system provider system and storage 110, 115, a mutually exclusive organization 120, 125, or a third party authentication service provider 160, and devices personal to the user or adaptable or assignable to the user 135, 145. Authentication credentials can be stored securely by the system provider storage 115, authentication service provider 160, mutually exclusive organization storage 125, or the user device 135, 145, and the like.

Alternatively, authentication credentials may be stored remotely in codes accessible by physical or electronic media of an authorized user or mandatory authorized user or may be generated by out of band communications amongst or between devices 135, 145, including via browser, token, SMS, mobile text, smartwatch verification, email verification code, external secure storage drive or device such as a USB drive or external hard drive, or other out of band authentication method or device such as an IoT device.

Once a registered, authorized user or mandatory authorized user has verified identity via the user's personal authentication construct, including where a mandatory step-up in identity verification is required by the system as described more fully in FIG. 5, the system can allocate one or more Identification Keys in accordance with the system policy (FIG. 2, 220*a*) or operating parameters (FIG. 2, 220*c*) for that user (FIG. 2, 220*b*) or the group of users to which the user is assigned.

Once the system has allocated Identification Keys for a mutually exclusive organization, system provider organization, or combination of one or more of each or both, the system provider server and storage 110, 115, can recover and then deconstruct, fragment, split, shard, erasure code, or otherwise decompose each Identification Key stored via Adaptive Recursive Descent (e.g. as described in U.S. patent application Ser. No. 16/845,895, titled "Systems and methods for adaptive recursive descent data redundancy"). Each Identification Key 230 can be deconstructed, fragmented, split, sharded, erasure coded, or otherwise decomposed into one or more SubKeys 310, which can be persisted and distributed into at least one or more different data stores, including those of a system provider organization storage 115, a mutually exclusive organization storage 125, a Cloud provider or third party storage 150, or the authorized user's or mandatory authorized user's device storage 135, 145.

The number of SubKeys created can be dynamically generated and persisted to one or more distributed data stores in accordance with system policies (FIG. 2, 210*a*), mutually exclusive organization or system provider operating parameters (FIG. 2, 220*c*) or user criteria (FIG. 2, 220*b*).

As the system provider server may allocate SubKeys to users, an individual authorized user or mandatory authorized user may not know how many SubKeys are allocated in total or how many they are allocated individually. SubKeys 310 can be dynamically distributed by the system provider server and storage 110, 115, in accordance with system policies or user profile or operating parameters (FIG. 2, 220*a*, 220*b*, 220*c*) across multiple data stores 115, 125, 150, including those selected by authorized users or mandatory authorized users (e.g., devices 135, 145). Storage of one or more SubKeys 310, on user devices 135, 145, can be driven by mutually exclusive organization or system provider organization policy (FIG. 2, 220*a*), operating parameters (FIG. 2, 220*c*), or user criteria (FIG. 2, 220*b*). Further, Identification Keys 230, and SubKeys 310, can be stored based on associations with specific user personal authentication constructs including personalized authentication sequences (FIG. 2, 220*d*) and step-ups (FIG. 5, 460) to enhance accountability and non-repudiation.

Figure 4:
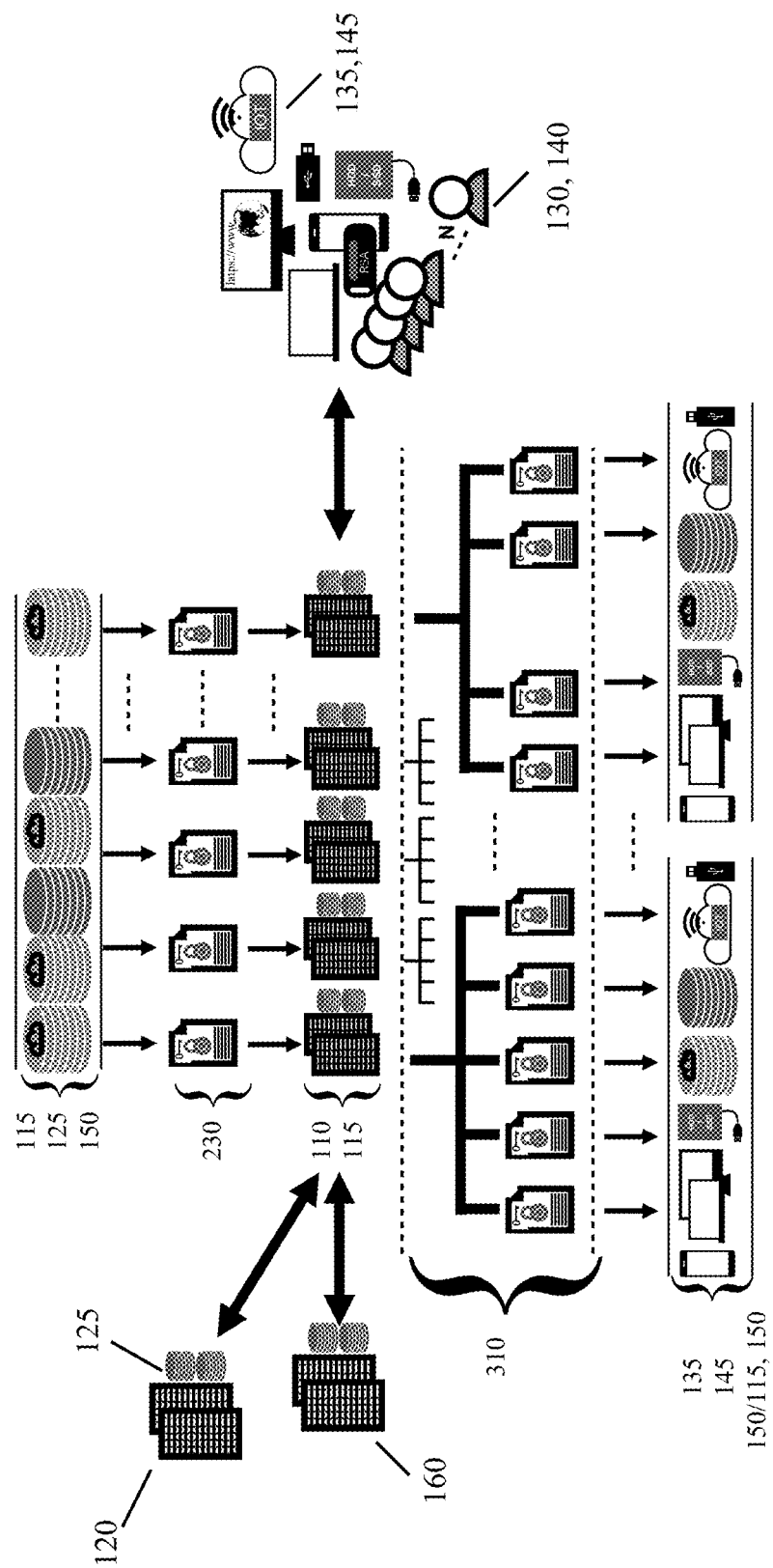
FIG. 4 depicts a workflow process for the allocation of Identification Keys or SubKeys to distributed data stores or locations for authorized users in a mutually exclusive organizational group, a system provider organizational group, or a combination thereof. Distribution of organizations or authorized users may be by geographic location or other discrete subset, where the conversion of one or more secret data objects is by Adaptive Recursive Descent according to an embodiment of the claimed invention.

FIG. 4 depicts a workflow process for allocation of Identification Keys or SubKeys according to an embodiment of the claimed invention. The workflow process describes the process for allocating Identification Keys 230, and SubKeys 310, to dynamically persisted or selected data stores or locations 115, 125, 150, 135, 145. The Keys 230 and SubKeys 310 can be allocated for authorized users or mandatory authorized users in at least one distributed or different mutually exclusive organization or group or service provider organization or group, or combination thereof as defined by system policies, operating parameters or user criteria (FIG. 2, 220*a*, 220*c*, 220*b*). Distribution of organizations, groups, authorized users or mandatory authorized users may be by group structure, business line, regulatory domain, geographic location or other discrete business, organizational, commercial, political, hierarchical or other criteria.

Additionally, according to an alternative embodiment of the claimed invention, instead of Identification Keys (FIG. 3, 230) being persisted to distributed data storage by the system provider server and storage (FIG. 3, 110, 115), at least one or more Identification Keys may be persisted to one or more of the same or different distributed system provider servers and storage (FIG. 4, 110, 115) where the conversion of one or more Identification Keys 230, into SubKeys 310, is by Adaptive Recursive Descent.

Additionally, in another embodiment of the claimed invention, SubKeys 310, can be persisted by different system provider servers 110, to distributed storage locations and platforms 115, 125, 150 in accordance with dynamic policies set for each distributed entity (being an organization member of a group) or group (FIG. 2, 220*a*) and each distributed entity's or group's operating parameters (FIG. 2, 220*c*). A SubKey created through a distributed system applying Adaptive Recursive Descent (FIG. 4, 110, 115) may preferably lack synchronous linkage with the originating system provider server and storage (FIG. 3, 110, 115) that created and persisted the SubKey, which can enhance system security and integrity for both identity verification and for data access authorization.

This embodiment of the claimed invention additionally provides greater assurance as to non-repudiatable identity verification and secret data object confirmation, as each distributed entity or group can solely recreate the secret data object relevant to it at the entity or group level. Subsidiary tiers may be able to verify identity and confirm Identity Keys from SubKeys before system confirmation to the next higher Adaptive Recursive Descent level.

Once an authorized user or mandatory authorized user of a distributed entity or group initially verifies identity, one of a number of distributed system provider servers and storage 110, 115, can recover the Identification Key 230 allocated to that user from distributed storage and can deconstruct, fragment, or shard the Identification Key 230, into one or more SubKeys 310. The SubKeys can be persisted into one or more data stores 115, 125, 150, 135, 145 in accordance with dynamic policies set for each distributed entity or group (FIG. 2, 220a) or operating parameters (FIG. 2, 220c).

Alternatively, Identification Keys generated by a distributed entity or group level system (FIG. 3, 110, 115) may be associated with another secret data object discernable to authorized or mandatory authorized users of that distributed entity or group, which can match the integrity of SubKey processing with non-repudiatable authorized or mandatory authorized user identity verification.

Alternatively, for Identification Keys generated at the top level system (FIG. 3, 110, 115) deconstruction, fragmentation, or sharding may be compared with a system derived, stored and matched Identification Key on subsequent reconstitution of a minimum subset of SubKeys 310, representing a minimum subset of authorized or mandatory authorized users 130, 140, related to the corresponding Identification Key 230, to aid systemic integrity with authorized or mandatory authorized user confirmation by identity verification. This may be with or without mandatory step up (FIG. 5, 460).

FIG. 5 describes a workflow process for the non-deterministic, non-repudiatable identity verification of a set of authorized or mandatory authorized users of one or more mutually exclusive organizations or system provider organizations according to embodiments of the claimed invention.

Authorized users or mandatory authorized users of a mutually exclusive organization or system provider organization can register with the system provider server and storage 110, 115. Their user credentials can be securely stored by the system in accordance with system policies and operating parameters (FIG. 2, 220b, 220a 220c).

Additionally, authorized users' and mandatory authorized users' authentication method options, devices and sequences can be validated against system valid options (FIG. 2, 220d) and in accordance with system operating parameters (FIG. 2, 220c) for users (FIG. 2, 220b) of a mutually exclusive organization or system provider organization respectively. Operating parameters (FIG. 2, 220c) for a mutually exclusive organization or system provider organization are prioritized in accordance with system policies (FIG. 2, 220a).

Additionally, in embodiments involving at least one mutually exclusive organizational group or system provider organizational group as defined by system policies and user profiles (FIG. 2, 220a, 220b), the relative priority of operating parameters (FIG. 2, 220c) and authentication methods, devices and sequences (FIG. 2, 220d) can be managed by the first level system provider server and storage (e.g. FIG. 3, 110, 115) for first level authorized users and mandatory authorized users, and mutually exclusive organizations and system provider organizations. Further, subsequent level system provider servers and storage can manage subsequent level authorized users and mandatory authorized users and mutually exclusive organizations and system provider organizations.

One or more system policies (e.g. FIG. 2, 220a), operating parameters (e.g. FIG. 2, 220c), or user criteria (e.g. FIG. 2, 220b) can manage the interactions amongst different user groups and organization groups, facilitating customized identity verification and data access for any combination of organizations and users of the system.

Once an authorized user or mandatory authorized user has registered at least one or more user devices 135, 145, at least one or more authentication methods can be created, changed, selected and stored securely in the system sequence library 440.

Additionally, mutually exclusive organizations or system provider organizations or groups thereof may set mandatory step-up policies 460, where a system policy (FIG. 2, 220a) requires increased security or resilience for one or more authorized users or mandatory authorized users or group of users.

Additionally, device-based authentication methods may communicate with the system provider server and storage 110, 115 via software development kit (SDK) or application program interface (API), or other communications method such as Ethernet, WiFi, NFC, LTE, SMS, Internet, IP, LiFi, public telephone service, PSTN, Microwave or other messaging or communications means, camera-based verification of codes generated by one or more other devices, or input of codes or one time codes or passwords generated by one or more devices or other input or output methods.

Additionally, communication via social networks such as Skype, Zoom, Hangouts, Chime, Teams and other Internet or other communications platforms may be used by authorized users or mandatory authorized users to communicate verification credentials, in accordance with system policies (FIG. 2, 220a) for authorized users or mandatory authorized users (FIG. 2, 220b).

Additionally, browser functionality or computer desktop or tablet or mobile phone applications may be used by authorized users or mandatory authorized users to verify identity via one or more personal authentication constructs, which can include one or more sequences of authentication methods 440, or mandatory step ups 460, or other system criteria or policy (FIG. 2, 200a, 220b, 220c, 220d), whether accessible on device 420, hosted by the system 410, supplied by mutually exclusive organization 430 or system provider organization 410, or authentication service provider 160.

Once registered and set up, authorized users or mandatory authorized users can interact with the system provider server and storage 110, 115 via user access portals that may be accessed by devices 135, 145. In another embodiment, user access via portal may be directly into the system provider server and storage 110, 115 or accessible from a mutually exclusive organization server and storage 120, 125. In another embodiment, device 135, 145 access may be direct to system provider server and storage 110, 115, or accessible via a mutually exclusive organization server and storage 120, 125.

Authorized users or mandatory authorized users can verify identity to the system via personal authentication constructs including one or more methods 440, devices 135, 145 and sequences 440 registered with the system. Personal authentication constructs for authorized users and mandatory authorized users can be created, maintained, selected and changed through the user access portal. Mandatory step ups 460, can also be created, maintained, selected and changed through the user access portal.

Once authorized users or mandatory authorized users have verified identity to the user access portal, the system may prompt each user additionally to verify identity to recover the one or more Identification Keys (FIG. 2, 230*a*, 230*b*, 230*c*, 230*d*, 230*e*, . . . 230*n*) persisted to one or more distributed storage locations or types or technologies by the system (FIG. 2, 115, 125, 150) created from secret data objects (FIG. 2, 210*a*, 210*b*, . . . 210*n*) and allocated to authorized users or mandatory authorized users.

Authorized users or mandatory authorized users can verify identity via the user access portal by applying their personal authentication constructs, which can include one or more authentication methods 410, 420, 430, devices, 135, 145, sequences 440 or mandatory step ups 460, to authorize the system to recover and allocate one or more stored Identification Keys (FIG. 3, 230). The system provider server and storage 110, 115 can recover the one or more Identification Keys allocated to authorized users or mandatory authorized users. Further, the system provider server and storage 110, 115 may decompose, fragment, shard or otherwise deconstruct each Identification Key into SubKeys (FIG. 3, 310).

SubKeys (FIG. 3, 310) are generated by the system 110, 115, and dynamically distributed to at least a number of mutually exclusive, discrete storage locations or types or technologies 135, 145, 115, 125, 150, equal to the number of SubKeys generated by the system, including storage on devices used personally or for personal use by authorized users or mandatory authorized users.

Additionally, authorized users or mandatory authorized users may verify identity via the user access portal to apply their personal authentication construct, comprising one or more authentication methods 410, 420, 430, devices, 135, 145, sequences 440 or mandatory step ups 460, so as to recover Identification Keys (FIG. 3, 230) from SubKeys (FIG. 3, 310), the system reconstructing each Identification Key (FIG. 3, 230).

Once at least a minimum valid subset of authorized users or mandatory authorized users have verified identity by applying their personal authentication construct, comprising one or more authentication methods 410, 420, 430, devices, 135, 145, sequences 440 or mandatory step ups 460, so as to recover Identification Keys (FIG. 3, 230) from SubKeys (FIG. 3, 310), the system reconstructing each Identification Key (FIG. 3, 230), the system may further reconstruct one or more secret data objects (FIG. 2, 210*a*, 210*b*, . . . 210*n*) from the one or more minimum subsets of Identification Keys (FIG. 2, 230*a*, 230*b*, 230*c*, 230*d*, 230*e*, . . . 230*n*).

Additionally, once the system has reconstructed the one or more secret data objects (FIG. 2, 210*a*, 210*b*, . . . 210*n*) from the one or more minimum subsets of Identification Keys (FIG. 2, 230*a*, 230*b*, 230*c*, 230*d*, 230*e*, . . . 230*n*), authorized users or mandatory authorized users may confirm the integrity of the one or more secret data objects after identity verification using their personal authentication construct, including one or more authentication methods 410, 420, 430, devices, 135, 145, sequences 440 or mandatory step ups 460.

Once authorized users or mandatory authorized users have confirmed the one or more secret data objects (FIG. 2, 210*a*, 210*b*, . . . 210*n*) as valid for a mutually exclusive organization, the system will restrict data access or upload to, or retrieval from, or other data related activities related to the mutually exclusive organization until after at least a minimum set of authorized users or mandatory authorized users of the system provider organization confirm the one or more secret data objects (FIG. 2, 210*a*, 210*b*, . . . 210*n*) as valid for the system provider organization.

Additionally, once authorized users or mandatory authorized users have confirmed the one or more secret data objects (FIG. 2, 210*a*, 210*b*, . . . 210*n*) as valid for a system provider organization, the system can enable data access for upload, retrieval or other data related activities for authorized users of the mutually exclusive organization.

Figure 6:
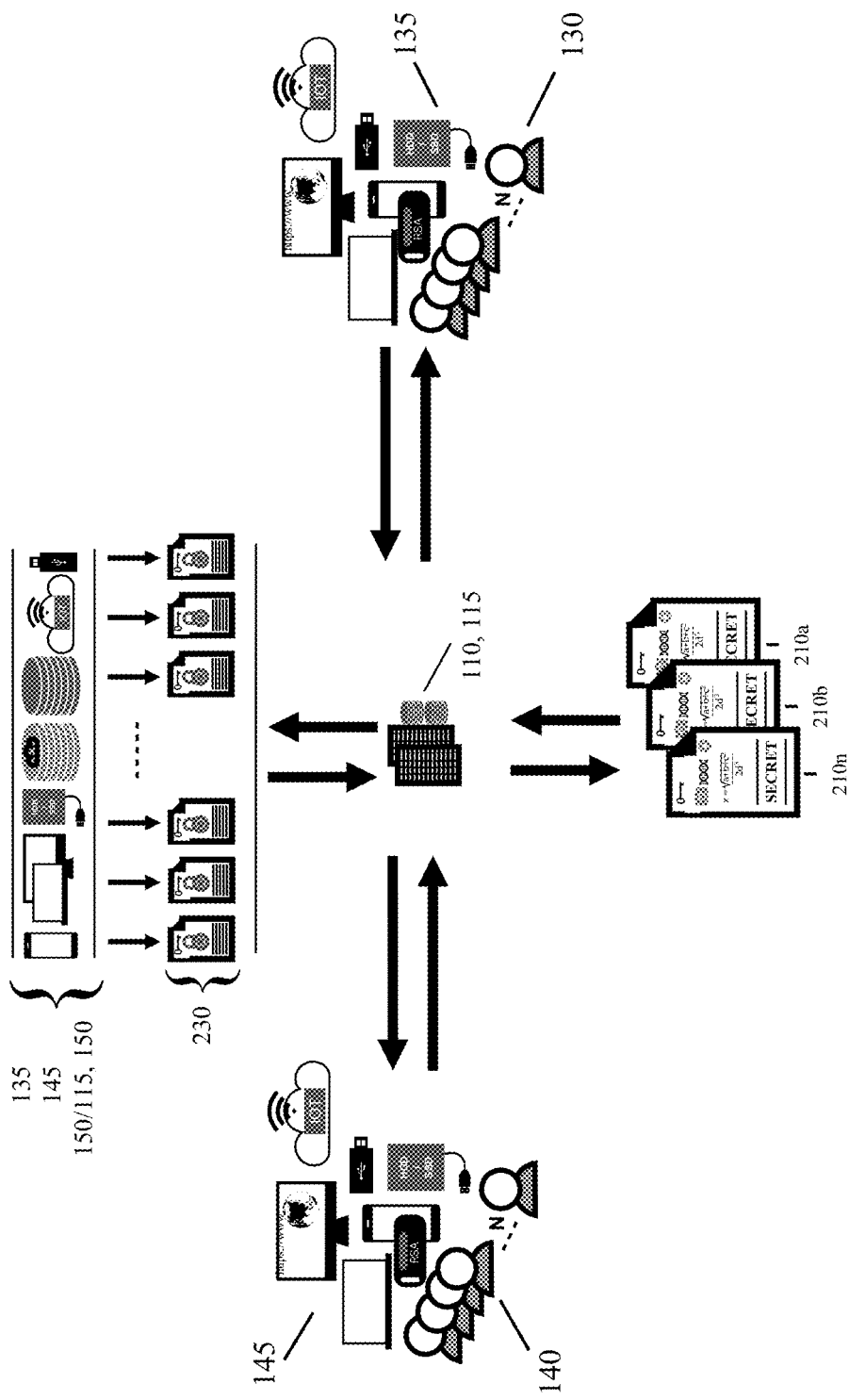
FIG. 6 depicts a workflow process for confirmation of secret data objects reconstructed from a set of Identity Keys or SubKeys allocated to valid authorized users and dynamically persisted to distributed data stores or locations according to embodiments of the claimed invention.

FIG. 6 additionally describes a process for mutually exclusive organization or system provider organization confirmation of secret data objects from Identity Keys (or SubKeys) by at least a valid minimum subset of authorized users or mandatory authorized users according to embodiments of the claimed invention.

Authorized users or mandatory authorized users of mutually exclusive organizations 130 and system provider organizations 140 verify identity by applying their personal authentication construct, comprising one or more authentication methods (FIG. 5, 410, 420, 430), devices, 135, 145, sequences (FIG. 5, 440) or mandatory step ups (FIG. 5, 460), so as to recover Identification Keys 230, generated and distributed by the system as SubKeys across multiple storage locations, including storage of devices used personally or for personal use by the authorized user or mandatory authorized user 135, 145, 115, 125, 150.

Figure 7:
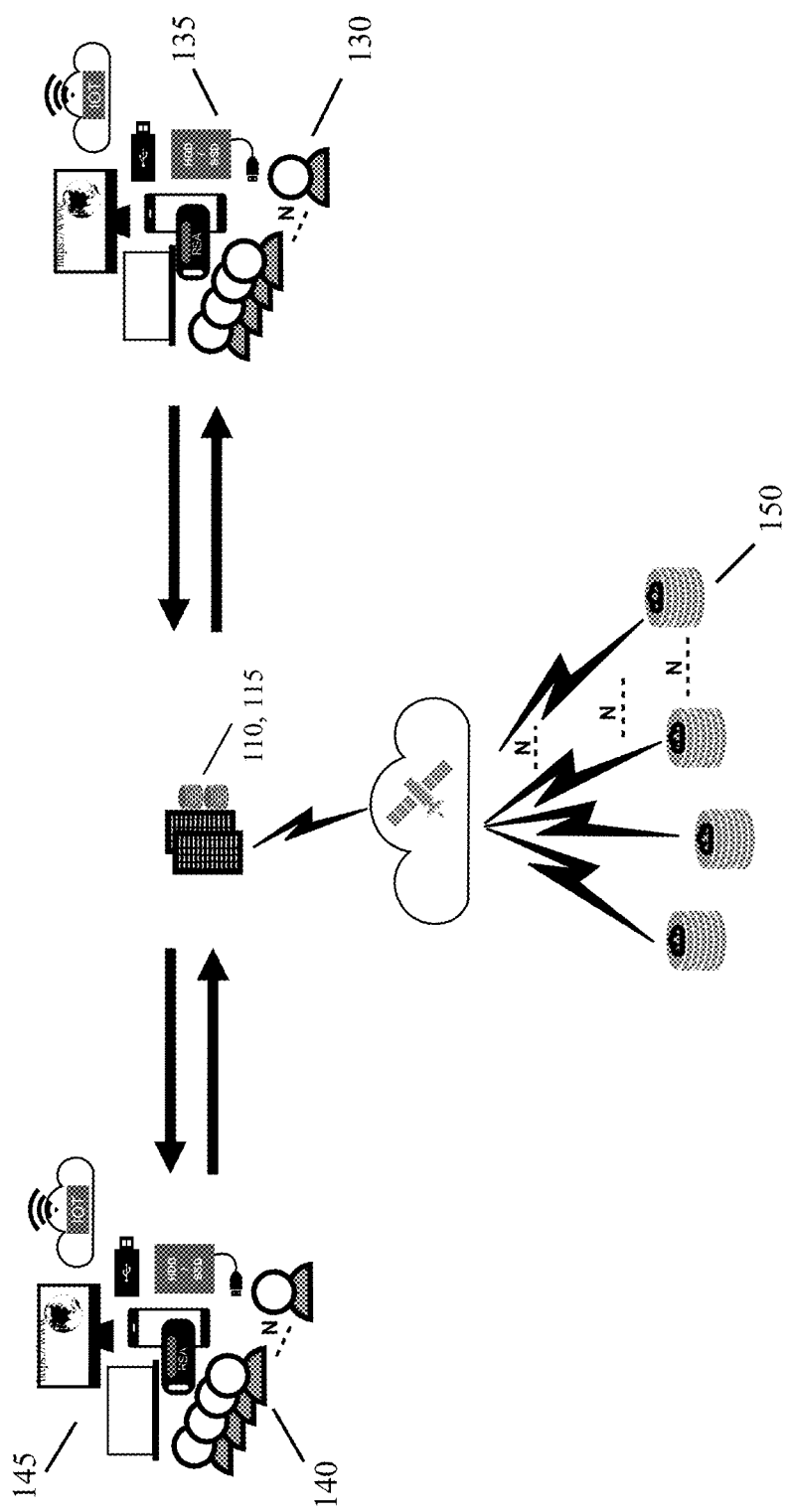
FIG. 7 depicts a workflow process for authorized access to upload, recover or otherwise access data objects after non-repudiatable confirmation of secret data objects according to an embodiment of the claimed invention.

FIG. 7 additionally describes a process for authorized access to upload, recover or access data objects by a mutually exclusive organization or organizations 130, previously persisted to multiple Cloud or third party storage locations or technologies or types 150, after confirmation of secret data objects by mutually exclusive organizations 130, and system provider organizations 140, according to an embodiment of the claimed invention.

Only where a minimum valid set of authorized users or mandatory authorized users from at least one mutually exclusive organization and at least one system provider organization verify identity to recover Identification Keys for subsequent reconstruction into and non-repudiatable confirmation of one or more secret data objects, may the system allow authorized upload, recovery or access to data objects persisted to undisclosed private, multiple storage locations or technologies or types 150.

The application of the above methods to different groups of mutually exclusive organizations or system provider organizations as herein described in FIG. 4 can be additionally or alternatively applied to the above descriptions.

Finally, FIGS. 1 to 7 in combination describe a system herein involving one or more methods of data security, privacy, resilience, and recovery together with multi-party, multi-user non-repudiatable and non-deterministic identity verification, access management and authorization methods. This combination provides a novel, dynamic, interoperable and unpredictable secure data access system hardened against insider compromise with data resilience at the data object, Identification Key or SubKey level against Cloud store or other storage location compromise, failure, disruption or downtime, including against ransomware.

For each one or more mutually exclusive organization and each one or more system provider organization, a minimum valid subset of authorized users or mandatory authorized users are required to apply valid personal authentication constructs to verify identity to recover distributed, fragmented, resilient, private and securely stored Identification Keys for subsequent recombination into one or more secret data objects, to be confirmed by said valid minimum subset of authorized users and mandatory authorized users of each mutually exclusive organization or system provider organization in combination before access to system protected, fragmented, private, securely and resiliently persisted data is authorized.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A method for data access comprising:
receiving, at a system provider server, a request for data access from an organization user;
transmitting to one or more organization users, a prompt for identity verification corresponding to the identity of each corresponding organization user, wherein at least one of the one or more users is different than the user requesting data access;
receiving, in response to the identity verification prompt, a plurality of identification key fragments from a plurality of storage locations or devices associated with at least a subset of the one or more organization users, wherein each identification key fragment is user specific;
generating an organization-specific data object from the plurality of identification key fragments;
confirming the organization-specific data object by the at least subset of the one or more organization users whose identities were validated;
identifying a plurality of mandatory organization users;
identifying a predetermined mandatory fragment threshold;
determining whether the plurality of identification key fragments contains one or more mandatory identification key fragments;
determining whether the one or more mandatory identification key fragments meets or exceeds the predetermined mandatory identification key fragment threshold; and
authorizing the request for data access based on confirming the organization-specific data object and a determination that the one or more mandatory identification key fragments meets or exceeds the predetermined mandatory fragment threshold.

2. The method of claim 1, further comprising:
transmitting notification of data access authorization to the organization user.

3. The method of claim 1, further comprising:
transmitting a notification of failed access from the system provider server subsequent to the system provider server failing to receive authorization to request or grant access.

4. The method of claim 1, further comprising:
determining whether the plurality of identification key fragments meets or exceeds a minimum fragment threshold, wherein the generating is further based on the determination.

5. The method of claim 1, further comprising:
identifying a plurality of organization users;
generating a plurality of identification key fragments based on the identified plurality of organization users, wherein the plurality of identification key fragments is equal to or greater than the plurality of organization users.

6. The method of claim 5, further comprising:
associating each identification key fragment with an organizational user;
storing information corresponding to an association between each identification key fragment and the corresponding organizational user; and transmitting each identification key fragment to one of a corresponding plurality of storage locations or types or devices.

7. A method for data access comprising:
receiving, at a system provider server, a request for data access from an organization;
transmitting to one or more system provider users, a prompt for identity verification corresponding to the identity of each corresponding system provider user;
receiving, in response to identity verification prompt, a plurality of identification key fragments recovered from a plurality of storage locations or devices associated with at least a subset of the one or more system provider users, wherein each identification key fragment is user specific;
generating a system provider-specific data object from the plurality of identification key fragments;
confirming the system provider-specific data object by the at least subset of the one or more system provider users whose identities were validated;
identifying a plurality of mandatory system provider users;
identifying a predetermined mandatory fragment threshold;
determining whether the plurality of identification key fragments contains one or more mandatory identification key fragments;
determining whether the one or more mandatory identification key fragments meets or exceeds the predetermined mandatory identification key fragment threshold; and
authorizing the request for data access based on confirming the system provider-specific data object and the determining whether the one or more mandatory identification key fragments meets or exceeds the predetermined mandatory identification key fragment threshold.

8. The method of claim 7, further comprising:
transmitting notification of data access authorization to an organization.

9. The method of claim 7, further comprising:
transmitting a notification of failed access from the system provider server subsequent to the system provider server failing to authorize access.

10. The method of claim 7, further comprising:
determining whether the plurality of identification key fragments meets or exceeds a minimum fragment threshold, wherein the generating is further based on the determination.

11. The method of claim 7, further comprising:
identifying a plurality of system provider users;
generating a plurality of identification key fragments based on the identified plurality of system provider users, wherein the plurality of identification key fragments is equal to or greater than the plurality of system provider users.

12. The method of claim 11, further comprising:

associating each identification key fragment with a system provider user; and storing information corresponding to an association between each identification key fragment and the corresponding system provider user; and transmitting each identification key fragment to one of a corresponding plurality of storage locations or types or devices.

* * * * *